Dec. 23, 1969   A. KURTI ET AL   3,485,450
PLANETARY GEAR SYSTEM DRIVE MECHANISM
Filed Dec. 19, 1967   2 Sheets-Sheet 1
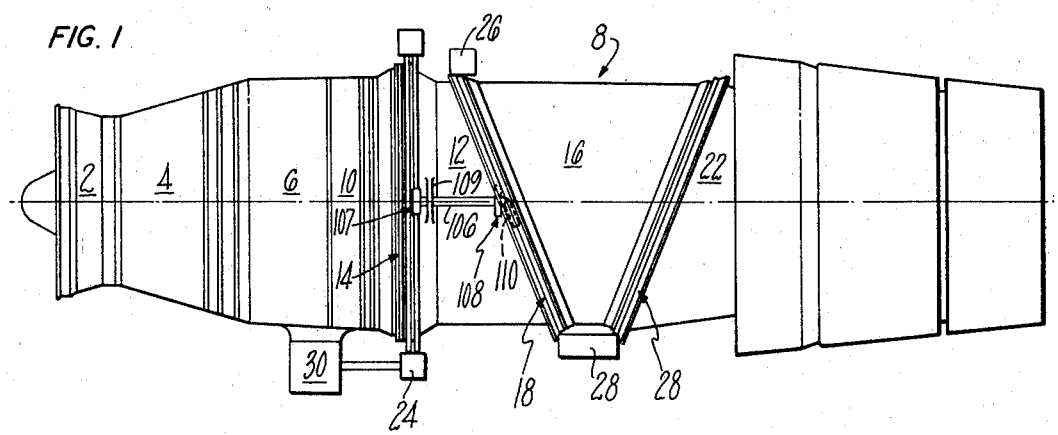
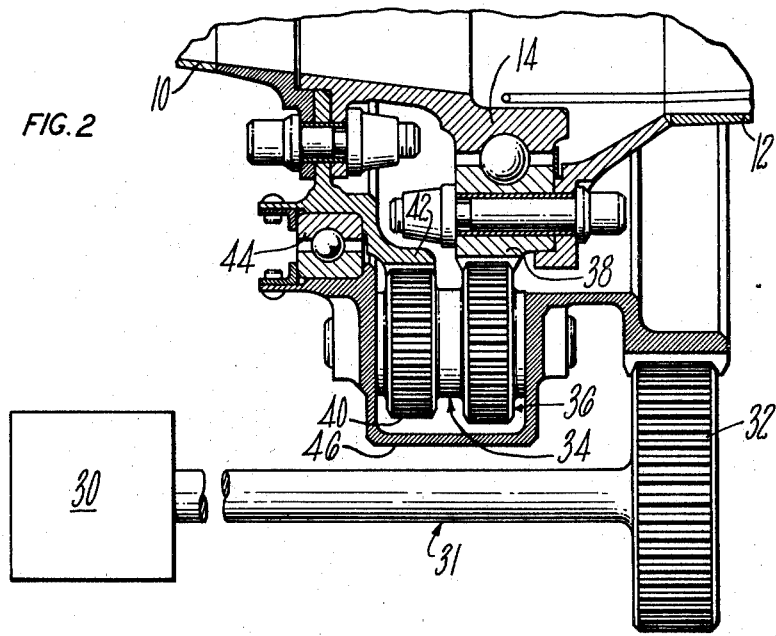
INVENTORS
ALEXANDER KURTI
RICHARD W. BATT
ATTORNEY

United States Patent Office 3,485,450
Patented Dec. 23, 1969

---

3,485,450
PLANETARY GEAR SYSTEM DRIVE MECHANISM
Alexander Kurti, West Hartford, and Richard W. Batt, Wethersfield, Conn., assignors to United Aircraft Corporation, East Hartford, Conn., a corporation of Delaware
Filed Dec. 19, 1967, Ser. No. 691,896
Int. Cl. B64c *15/04;* B64b *1/36*
U.S. Cl. 239—265.35                    9 Claims

ABSTRACT OF THE DISCLOSURE

A planetary gear drive system for a swivelable exhaust deflection apparatus, the drive system being capable of rotating a plurality of nozzle segments in various directions from a single power drive. Additionally, the rotation of the nozzle segments is accomplished with a minimum of distortion and at an optimum speed.

---

This application is reported as a Subject Invention under Government contract AF 33(657)15786.

BACKGROUND OF THE INVENTION

This invention relates to a planetary gear drive system for a swivelable exhaust deflection apparatus for deflecting a gas stream of a gas turbine engine principally adapted for powering vertical take-off and landing aircrafts.

With the advent of vertical take-off and landing aircraft, a requirement has arisen whereby the exhaust stream of the engine should be directed in a downward direction for at least a part of the flight regime. While the prior art discloses a number of constructions for causing a suitable exhaust deflection apparatus to rotate, the prior art constructions have at least one or all of the following disadvantages: the drive systems employed operate at a less than optimum speed; the drive systems require an excessively high torque compounded by unevenly distributed loads necessitating an excessively heavy supporting structure; the drive systems employed are generally complex in construction, all of these foregoing features adversely affecting cost and weight of the overall exhaust deflection apparatus. Examples of prior art constructions which are subject to the foregoing disadvantages are contained in U.S. Patent Nos. 2,886,262 and 3,162,011.

SUMMARY OF THE INVENTION

It is the primary object of the present invention to provide a planetary drive system for a swiveled deflection apparatus for deflecting the exhaust stream of a gas turbine engine, the planetary drive system being constructed so as to apply a low torque to the nozzle segments, causing rotation of the nozzle segments at an optimum speed, and imparting to the nozzle segments loads which are evenly distributed around the periphery of the segments.

The present invention accomplished the foregoing object by positioning a peripheral gear on each segment to be rotated. Engaging this gear and driving it is a peripheral differential gear means, this differential gear arrangement being driven by any appropriate means, such as an electric motor. This drive means is the only drive means employed, power transmission means being provided between the differential gear means for the first rotatable segment and any other differential drive means associated with segments downstream of the first rotatable segment. By providing a drive gear means which engages a peripheral driven gear around the periphery of each of the segments, a lower torque is imparted to the driven gear; and secondarily, the loads imparted to the nozzle segments are evenly distributed around the periphery of the nozzle segments with the result that the nozzle segments are substantially distortion free during actuation. This provides the capability of employing thin wall nozzle segments, resulting in a substantial weight reduction. The present invention, also in a preferred embodiment, provides a drive construction for rotating a three segment swiveled deflector. In this embodiment, a bevel gear drive system mounted on the first segment engages a bevel gear arrangement on the third segment. The bevel gear construction is such that the first and third segments rotate in the same direction, while the second or intermediate segment rotates in a direction opposite to the first and third segments, the resulting configuration being an exhaust deflector which will deflect the exhaust stream of a gas turbine in a desired direction.

BRIEF DESCRIPTION OF THE DRAWINGS

FIGURE 1 is a plan view of a gas turbine engine showing the device of the invention in an axial exhaust mode.

FIGURE 2 is a fragmentary sectional view showing the device of the invention in relation to a first rotatable segment.

DESCRIPTION OF THE PREFERRED EMBODIMENT

Figure 3:
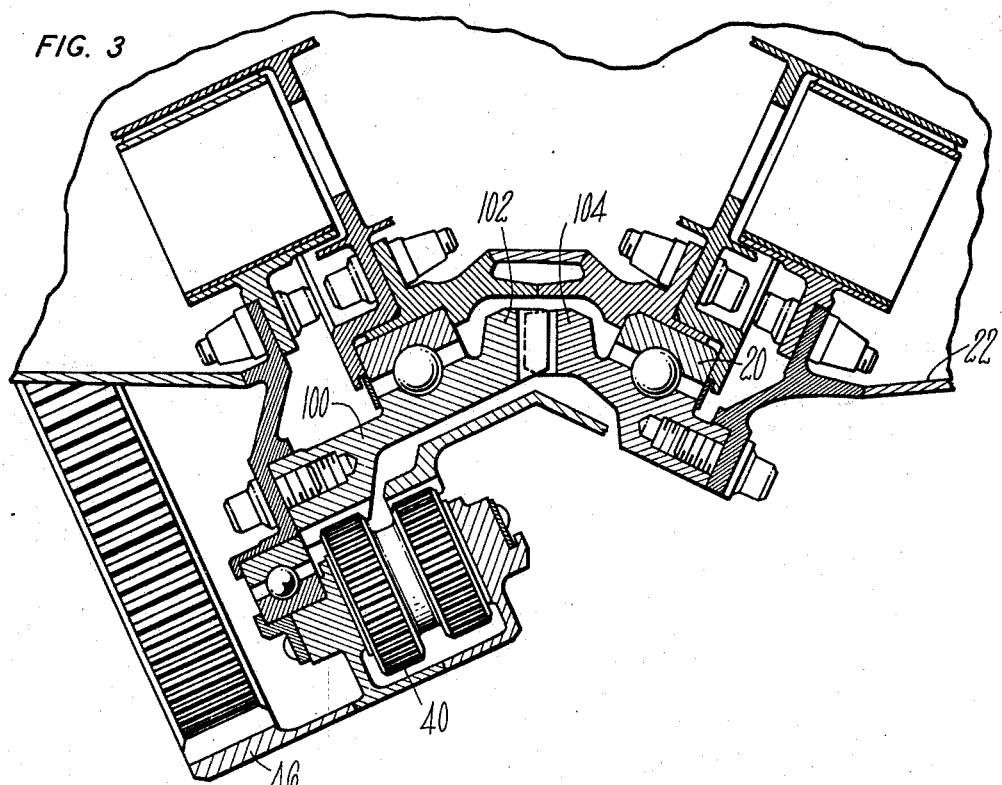
FIGURE 3 is a fragmentary sectional view showing the device of the invention and its relationship between the first and third rotatable segments.

As shown in FIGURE 1, air passes through compressor 2, burner section 4, turbine 6 and is then discharged to atmosphere through an exhaust, thereby generating thrust. As shown, exhaust nozzle 8 is connected downstream of turbine 6, and is comprised of fixed and swivelable or rotatable nozzle segments. First nozzle segment 10 is fixed and connected downstream therefrom is a first rotatable nozzle segment 12 by bearing support means 14. Second rotatable nozzle segment 16 is connected to the downstream end of nozzle segment 12 by bearing support means 18. Connected downstream therefrom by bearing support 20 is a third rotatable nozzle segment 22. The exhaust deflection system heretofore described is well known in the prior art and may be of the type described in U.S. application Ser. No. 642,597, now Patent No. 3,429,509 entitled Cooling Scheme for a Three Bearing Swivel Nozzle, by S. J. Markowski filed May 31, 1967.

As illustrated in FIGURE 1, the drive system for causing the rotation of the swivel nozzle segments is indicated generally by the elements designated by the numerals 24, 26, and 28. The element designated 24 in FIGURE 1 is the drive system for the first rotatable nozzle segment 12, and it is to this element to which the actuating force for an entire drive system is supplied by actuating means 30.

FIGURE 2 describes element 24 in more detail. As shown, actuating means 30 causes gear 32 to rotate, gear 32 in turn causing ring cage 46 and differential gear means 34 to turn, thus rotating segment 12. A differential gear means is necessary in order to cause the nozzle segment 12 to rotate at relatively slow speed, while the power drive 30 and gear 32 are turning at optimum high speed. Also ring cage 46 is rotating at only relatively moderate speed to conform with the planet system. Gear 36 of the differential means is the driver of the system 24 and engages first ring gear 38 which is a peripheral gear and is mounted on the first nozzle segment 12. It is here pointed out that gear 36 of differential gear means 34 and first ring gear 38, which is mounted on nozzle segment 12, are in peripheral engagement. More specifically, the drive gear 36 may be comprised of a plurality of pinions which engage peripheral first ring gear 38 around the circumference of nozzle segment 12. It should be clear from this that when actuating means 30 is caused to move, gear 32 through differential gear means 34 and peripheral first ring gear 38 cause nozzle segment 12 to rotate in a desired direction. This rotational movement, because of the peripheral gear engagement is accomplished with a minimum of torque at power shaft 31 and with light-tooth loading at each engagement 36 to 38, and additionally with the loads evenly distributed about the periphery of ring gear 38 on nozzle segment 12. In this manner, the high torque loads in the nozzle segments are accommodated. Further, since the segment is distorted a minimal amount, the capability of using thin walled segments is provided. This permits the exhaust deflector weight to be reduced substantially.

Gear 40 of differential gear means 34 engages stationary ring gear 42, gear 42 being mounted directly on fixed nozzle segment 10 and used to mount auxiliary bearing 44 which in turn supports the pinion cage 46 and the plurality of pinion gears 36 and 40.

Figure 4:
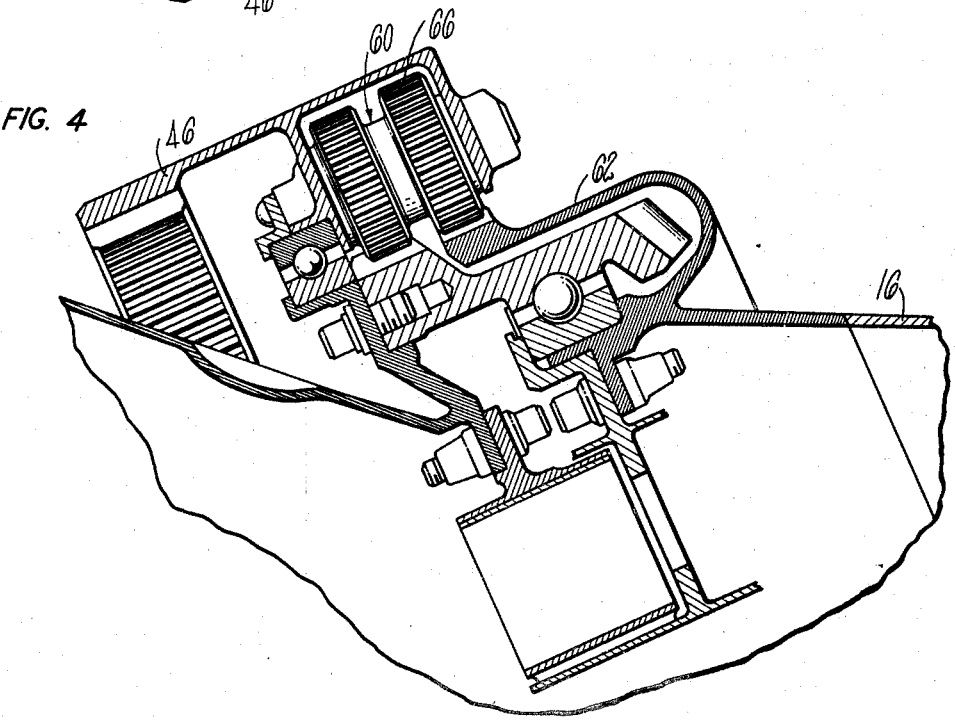
FIGURE 4 is a fragmentary sectional view showing the device of the invention and its relationship between the first and second rotatable segments.

FIGURE 4 illustrates, in detail, the gear drive arrangement for the nozzle segment immediately downstream of nozzle segment 12. The drive system is essentially as hereinbefore described, that is, a second differential gear means 60, which engages and drives a peripheral gear means 62 which is mounted on nozzle segment 16. The second differential gear means is driven by transfer shaft 106 (FIGURE 1) which is driven by a second ring gear 30 connected to pinion cage 46 and driven thereby. Hence, the second differential gear means 60, and therefore, nozzle segment 16 is driven by the first differential gear means 34. More specifically, pinion cage 46 is driven by power source 30 and pinion 32, by means of gear 107, shaft 106 and gear 108. Elements 106, 107 and 108 are the transfer shaft functional elements mounted on segment 12 by means of case mounts 109 and 110 as illustrated in FIGURE 1. This transfer shaft assembly is designed to drive the intermediate segment 16 at the correct speed and in opposite direction relative to segment 12. Gear means 60 is of a similar construction as gear means 36 and engages gear 62 on nozzle segment 16 much in the same manner as gear 36 engages gear 38, that is, gear 62 and 38 are in peripheral engagement with their mating pluralities of pinions 66 and 36 respectively. The gears of second differential gear means 60 are arranged such that they cause nozzle segment 16 to rotate in a direction opposite to nozzle segment 12. It is pointed out that the plane of reference for rotation is rear looking forward.

FIGURE 3 illustrates a gear drive system which may be utilized when a three bearing swivel deflector is the desired construction. In this construction, the gear drive systems for the first and second rotatable segments are as hereinbefore described. However, gear 40 of FIGURE 1 rather than engaging a stationary gear now engages a gear which is a bevel gear at a point remote from the point of engagement. This gear is indicated by the numeral 100 and the bevel gear is indicated by the numeral 102. Bevel gear engages bevel gear 104 which is carried by third rotatable segment 22. Therefore, as bevel gear 104 is caused to move by bevel gear 102 of the first differential gear means 34, bevel gear 104 causes the third rotatable nozzle segment 22 to rotate. The arrangement of the bevel gear 104 is such that it causes nozzle segment 16 to rotate in the same direction as nozzle segment 12.

It is to be understood that the invention is not limited to the specific embodiments herein illustrated and described, but may be used in other ways without departure from its spirit as defined by the following claims.

We claim:

1. A planetary drive system for an exhaust deflector apparatus for a gas stream from an engine including an exhaust duct comprised of a plurality of concentric, normally axially aligned, fixed and movable nozzle segments, each adjacent movable segment being connected together and supported by bearing means, the movable segments being rotatable with respect to one another at the bearing means so as to provide a curved deflector, wherein the improvement comprises:

actuation means positioned on the exhaust duct for driving the planetary drive system;

a first ring gear on a first movable nozzle segment;

a first differential gear means connected to the actuating means and engaging the first ring gear for moving the segment in a predetermined direction.

a second differential gear means;

means extending between the first and second differential gear means whereby the second differential gear means is driven by the first differential gear means; and gear means on a second movable segment which are engaged by the second differential gear arrangement for moving the second segment in a predetermined direction.

2. A planetary drive system as in claim 1 wherein:

the first ring gear extends around the periphery of the segment, and the first differential gear means is in peripheral engagement therewith; and the gear means extends around the periphery of the second movable segment, and the second differential gear means is in peripheral engagement therewith.

3. A planetary drive system as in claim 1 wherein:

the first ring gear and the first differential gear means are arranged to cause the first movable nozzle segment to rotate in a clockwise direction with respect to its bearing axis; and the gear means and the second differential gear means are arranged to cause the second movable nozzle segment to rotate in a counterclockwise direction with respect to its bearing axis.

4. A planetary drive system for an exhaust deflector apparatus for a gear stream from an engine including an exhaust duct comprised of a plurality of concentric normally axially aligned fixed and movable nozzle segments, each adjacent movable segment being connected together and supported by bearing means, the movable segments being rotatable with respect to one another at the bearing means so as to provide a curved deflector, wherein the improvement comprises:

actuation means positioned on the exhaust duct for driving the planetary drive system;

a first ring gear on a first movable segment, the first ring gear extending around the periphery of the segment;

a first peripheral differential gear means which is connected to the actuating means and also engages the first ring gear, the first differential gear means being driven by the actuating means and the differential gear means driving the first ring gear, the differential gear means and the first ring gear being arranged so that the first movable segment is caused to rotate in a predetermined direction;

a second ring gear connected to a pinion cage on the first differential gear means and driven thereby;

a transfer shaft connected to the cage and driven thereby;

a second peripheral differential gear means, the second differential gear means being driven by the transfer shaft; and peripheral gear means on a second movable nozzle segment which are engaged by the second differential gear means and driven thereby, the second differential gear means and the peripheral gear being arranged such that the second movable segment is caused to rotate a predetermined direction.

5. A planetary drive system as in claim 4 wherein:

the first ring gear and the first differential gear means are arranged to cause the first movable nozzle segment to rotate in a clockwise direction with respect to its bearing axis; and the peripheral gear means and the second differential gear means are arranged to cause the second movable nozzle segment to rotate in a counterclockwise direction with respect to its bearing axis.

6. A planetary drive construction as in claim 4 including:

a stationary ring gear positioned on the bearing means associated with the rotatable nozzle segments actuated by the first differential gear means, this stationary ring gear supporting the pinion cage drive.

7. A planetary drive system for an exhaust deflector apparatus for a gas stream from an engine including an exhaust duct comprised of a plurality of concentric normally axially aligned fixed and movable nozzle segments, each adjacent movable segment being connected together and supported by bearing means, the movable segments being rotatable with respect to one another so as to provide a curved deflector, wherein the improvement comprises:

actuation means positioned on the exhaust duct for driving the planetary drive system;

a first ring gear on a first movable nozzle segment;

a first differential gear means connected to the actuating means and engaging the first ring gear for moving the segment in a predetermined direction;

a second differential gear means;

means extending between the first and second differential gear means whereby the second differential gear means is driven by the first differential gear means;

gear means on a second movable nozzle segment which are engaged by the second differential gear means for moving the second nozzle segment in a predetermined direction;

a first bevel gear connected to the first differential gear means and driven thereby; and a second bevel gear connected to a third movable nozzle segment and in engagement with the first bevel gear, the first bevel gear being driven by the first differential gear means and the first bevel gear driving the second bevel gear, the first and second bevel gears being arranged such that the first rotatable nozzle segment and the third rotatable nozzle segment rotate the same direction with respect to one another.

8. A planetary drive system as in claim 7 wherein:

the first ring gear extends around the periphery of the segment, and the first differential gear means is in peripheral engagement therewith; and the gear means extends around the periphery of the second movable segment, and the second differential gear means is in peripheral engagement therewith.

9. A planetary drive system as in claim 7 wherein:

the first ring gear and the first differential gear means are arranged to cause the first movable nozzle segment to rotate in a clockwise direction with respect to its bearing axis;

the peripheral gear means and the second differential gear means are arranged to cause the second movable nozzle segment to rotate in a counterclockwise direction with respect to its bearing axis; and the first and second bevel gears are arranged to cause the third movable nozzle segment to rotate in a clockwise direction with respect to its bearing axis.

References Cited

UNITED STATES PATENTS

| 2,886,262 | 5/1959 | Fletcher | 239—265.35 |
| 3,260,049 | 7/1966 | Johnson | 239—265.35 |
| 3,341,229 | 9/1967 | Wilde | 239—265.35 |

EVERETT W. KIRBY, Primary Examiner

U.S. Cl. X.R.

60—232; 244—52